(12) United States Patent
Gopal

(10) Patent No.: US 6,925,585 B1
(45) Date of Patent: Aug. 2, 2005

(54) METHOD AND APPARATUS FOR CHECKING LEVEL OF SNMP MIB SUPPORT BY NETWORK DEVICES

(75) Inventor: Niraj Gopal, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 597 days.

(21) Appl. No.: 09/895,561

(22) Filed: Jun. 29, 2001

(51) Int. Cl.$^7$ .............................................. G06F 11/00
(52) U.S. Cl. ......................................... 714/43; 709/220
(58) Field of Search ............................. 714/43, 44, 56; 709/220, 221, 224, 230; 718/1, 100, 101–104

(56) References Cited

U.S. PATENT DOCUMENTS

| | | | | |
|---|---|---|---|---|
| 5,457,658 A | * | 10/1995 | Niijima et al. | 365/218 |
| 5,491,796 A | * | 2/1996 | Wanderer et al. | 709/224 |
| 5,613,100 A | * | 3/1997 | Anezaki | 710/65 |
| 6,052,724 A | * | 4/2000 | Willie et al. | 709/223 |
| 6,292,909 B1 | * | 9/2001 | Hare | 714/40 |
| 6,363,421 B2 | * | 3/2002 | Barker et al. | 709/223 |

\* cited by examiner

*Primary Examiner*—Dieu-Minh Le
(74) *Attorney, Agent, or Firm*—Thelen Reid & Priest LLP; David B. Ritchie

(57) ABSTRACT

A method and apparatus for checking the level of SNMP MIB support by network devices. An input text file indicating the MIB variables and their associated VALID/INVALID values is provided by the device designer. An input file is created for each NMS management application for which support is desired or required. The process includes identifying the variable, obtaining the value for the variable, and checking the value against any and all VALID/INVALID) values. If the value of any variable is found to not be valid or to be invalid, then an error message is generated. The process is repeated with each MIB variable in the input file provided by the device designer. After the input file is empty, one or more output files for each NMS management application for which support has been checked is generated.

24 Claims, 3 Drawing Sheets

METHOD AND APPARATUS FOR CHECKING LEVEL OF SNMP MIB SUPPORT BY NETWORK DEVICES

FIELD OF THE INVENTION

The present invention relates generally to management of communication networks. More specifically, the present invention relates to a method and apparatus for checking the level of Simple Network Management Protocol (SNMP) Management Information Base (MIB) support by network devices.

BACKGROUND OF THE INVENTION

A successful communication network depends in large part on planning. Part of planning includes designing the various devices in the network for ease of management. To this end, a communication protocol known as Simple Network Management Protocol (SNMP) was developed and is commonly utilized. SNMP commands include GET for reading information and SET for configuring information. In general, the management of the network is controlled by a Network Management System (NMS). Each device in the network running a SNMP agent has a set of variables about itself which the management applications in the NMS can query. Each set of variables is known as a Management Information Base (MIB). Some MIB variables may depend on other variables. Each variable may have one or more values that are VALID for that variable, one or more values that are INVALID for that variable, or one or more of both. The question of validity is relative to a point of view where the NMS may find one result and the MIB may find another for the same variable. Further, each variable may be either a scalar or a vector. There may be more than one MIB for each device. Devices may include routers, switches, access servers, and the like.

In a further effort to promote the ease of network management, a standard known as Enterprise Management BaseLine Embedded Manageability (EMBLEM) was developed by Cisco Systems, Inc. of San Jose, Calif. The intent of the development of EMBLEM was for every device designer to comply with the standard and thereby improve network manageability.

A definite need exists for an automated means for checking the level of SNMP MIB support by a network device. Specifically, a need exists for a method and apparatus which may be capable of SNMP GET and SET of MIB variables to check their values, capable of verifying any variables that have been SET, and capable of providing a failure report. Ideally, such an automated means would be user friendly, robust, quick, and accurate.

BRIEF DESCRIPTION OF THE INVENTION

A method and apparatus for checking the level of SNMP MIB support by network devices is disclosed. An input text file indicating the MIB variables and their associated VALID/INVALID values is provided by the device designer. An input file is created for each NMS management application for which support is desired or required. The process includes identifying the variable, obtaining the value for the variable, and checking the value against any and all VALID/INVALID values. If the value of any variable is found to not be valid or to be invalid, then an error message is generated. The process is repeated with each MIB variable in the input file provided by the device designer. After the input file is empty, one or more output files for each NMS management application for which support has been checked is generated.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings:

FIG. 2, incorporating

DETAILED DESCRIPTION

Embodiments of the present invention are described herein in the context of a method and apparatus for checking the level of SNMP MIB support by network devices. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the specific goals of the developer, such as compliance with application-and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature may also be used without departing from the scope and spirit of the inventive concepts disclosed herein.

In order to check the level of SNMP MIB support by network devices, an input text file indicating the MIB variables and their associated VALID/INVALID values is provided by the device designer. Using the EMBLEM specification, an input file is created for each NMS management application for which support is desired or required. The level of EMBLEM conformance of the device can be checked during the design development and corrections can be made to the device to assure full MIB support when the device is completed.

Figure 1:
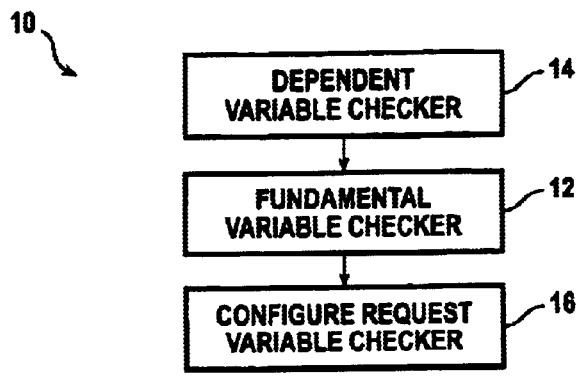
FIG. 1 is a block diagram of an apparatus for checking the level of manageability support of a network device.

Turning first to FIG. 1, a block diagram of an apparatus 10 for checking the level of manageability support of a network device is shown. The apparatus includes a fundamental variable checker 12, a dependent variable checker 14, and a configure request variable checker 16. The organization of the elements of the apparatus 10 is not rigid and the elements may be reorganized to suit the particular circumstances. In the fundamental variable checker 12, the variable is identified, the value for the variable is obtained, and the value is checked against any and all VALID/INVALID values. If the value of the variable is found to not be valid or to be invalid, then an error message is generated. In the dependent variable checker 14, the variable is identified and found to have a variable that depends from it. In this case, the values for both the variables are obtained and their values are checked against any and all VALID/INVALID values. If the values of the variables are found to not be valid or to be invalid, then an error message is generated. In the configure request variable checker 16, the variable is identified and it is observed that it needs to be SET to a new value. Assuming that the SET request is successful, one or more associated variables may exist that will change as a result of the SET and should be checked. Since the associated variables may not change immediately, it may be necessary for the checking to wait for a predetermined period of time before checking the associated variables. After the wait, the value for the associated variable is obtained and the value is checked against any and all VALID/INVALID values. If the value of the associated variable is found to not be valid or to be invalid, then an error message is generated.

Any error message that is generated may take any of a number of forms. The form may be selectable by the user. One valid form is for the error message to be generated as one or more output files for each NMS management application for which support has been checked. The output file may include all of the standard SNMP errors in addition to the MIB variable errors found. In addition, the output file may include the successes as well as the failures. Further, the output file may include all of the variables checked and their descriptions.

Figure 2B:
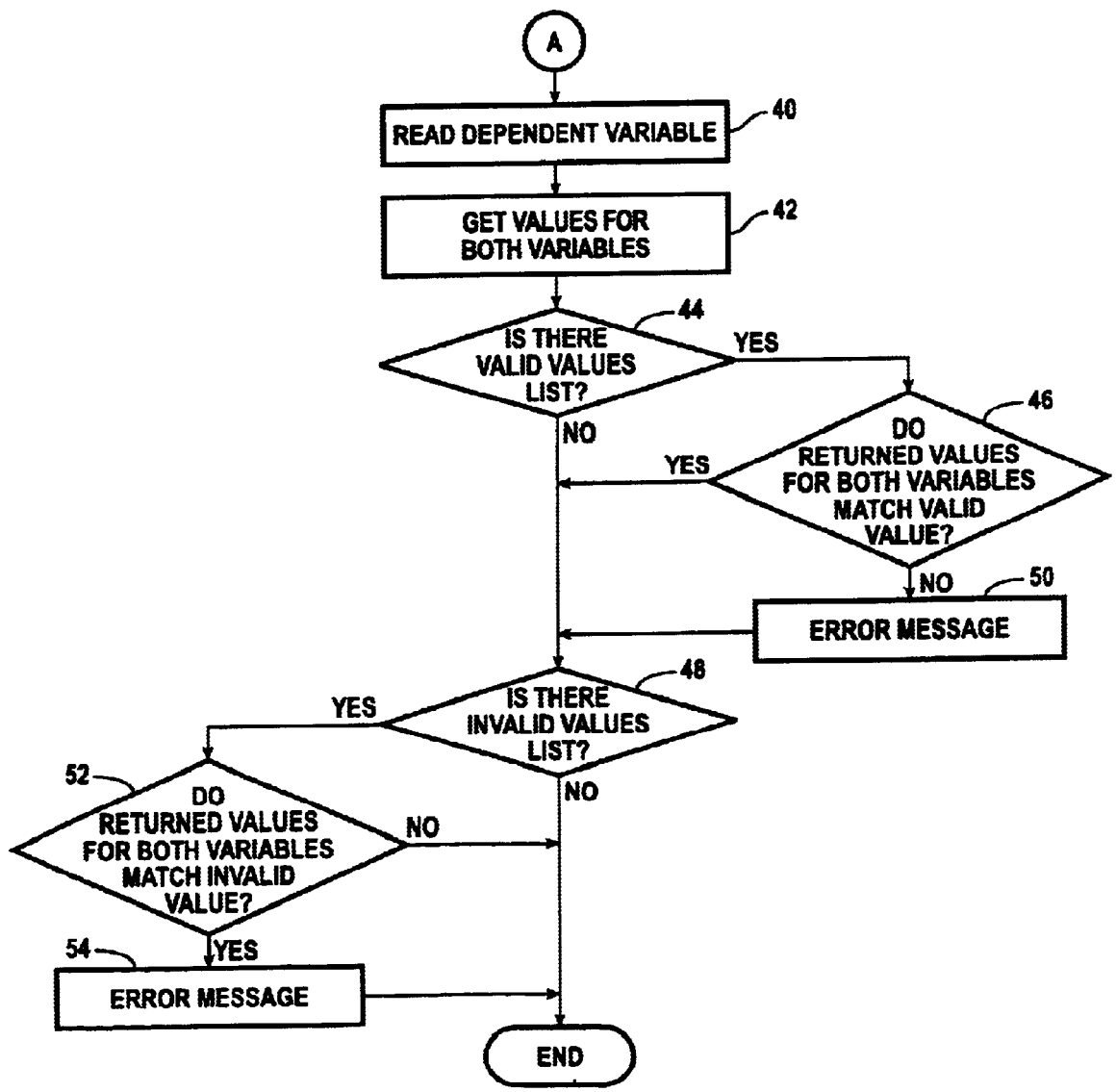
FIGS. 2A, 2B, and 2C, is a logic flow diagram of a process for checking the level of SNMP MIB support by network devices.
Figure 2A:
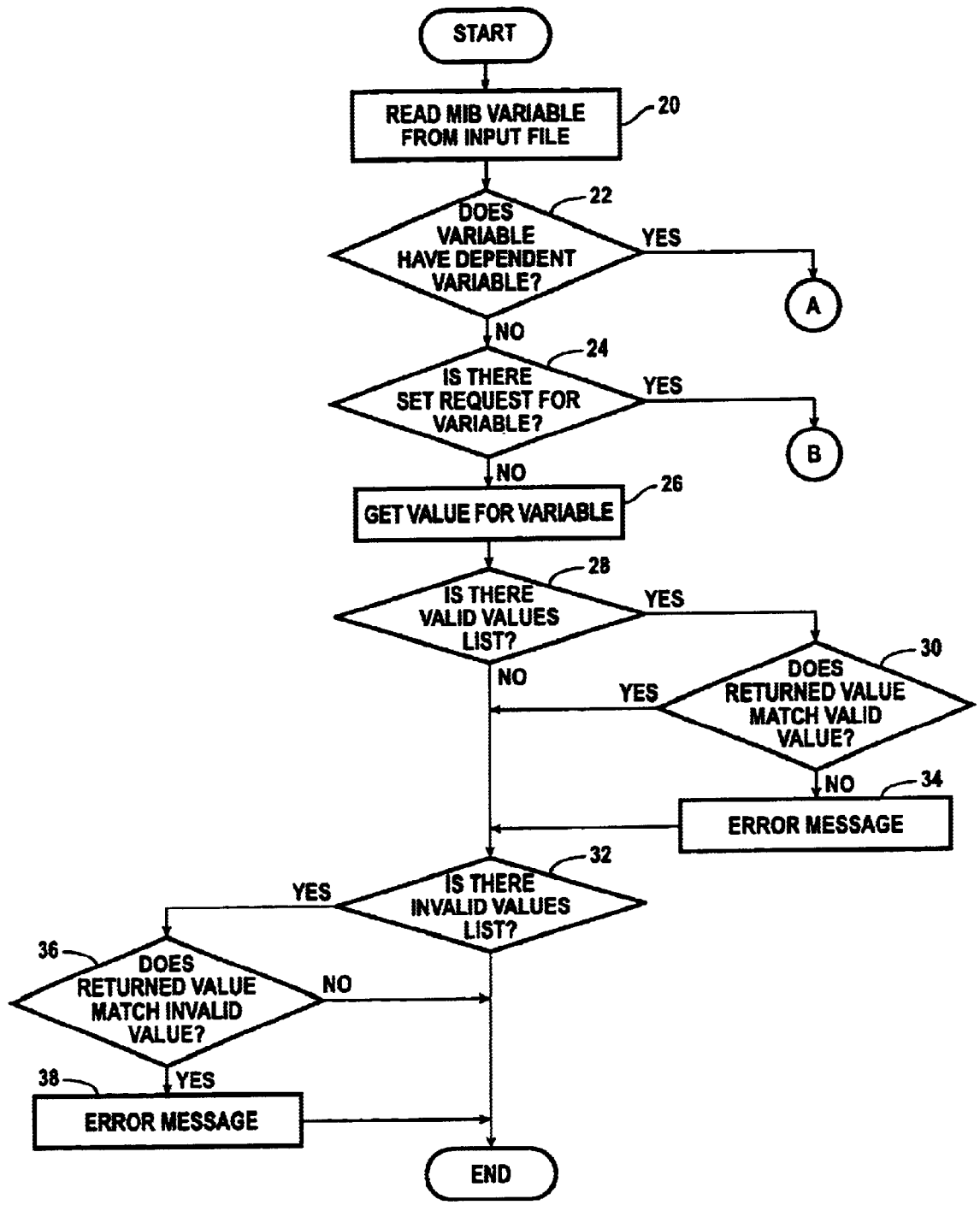
Figure 2C:
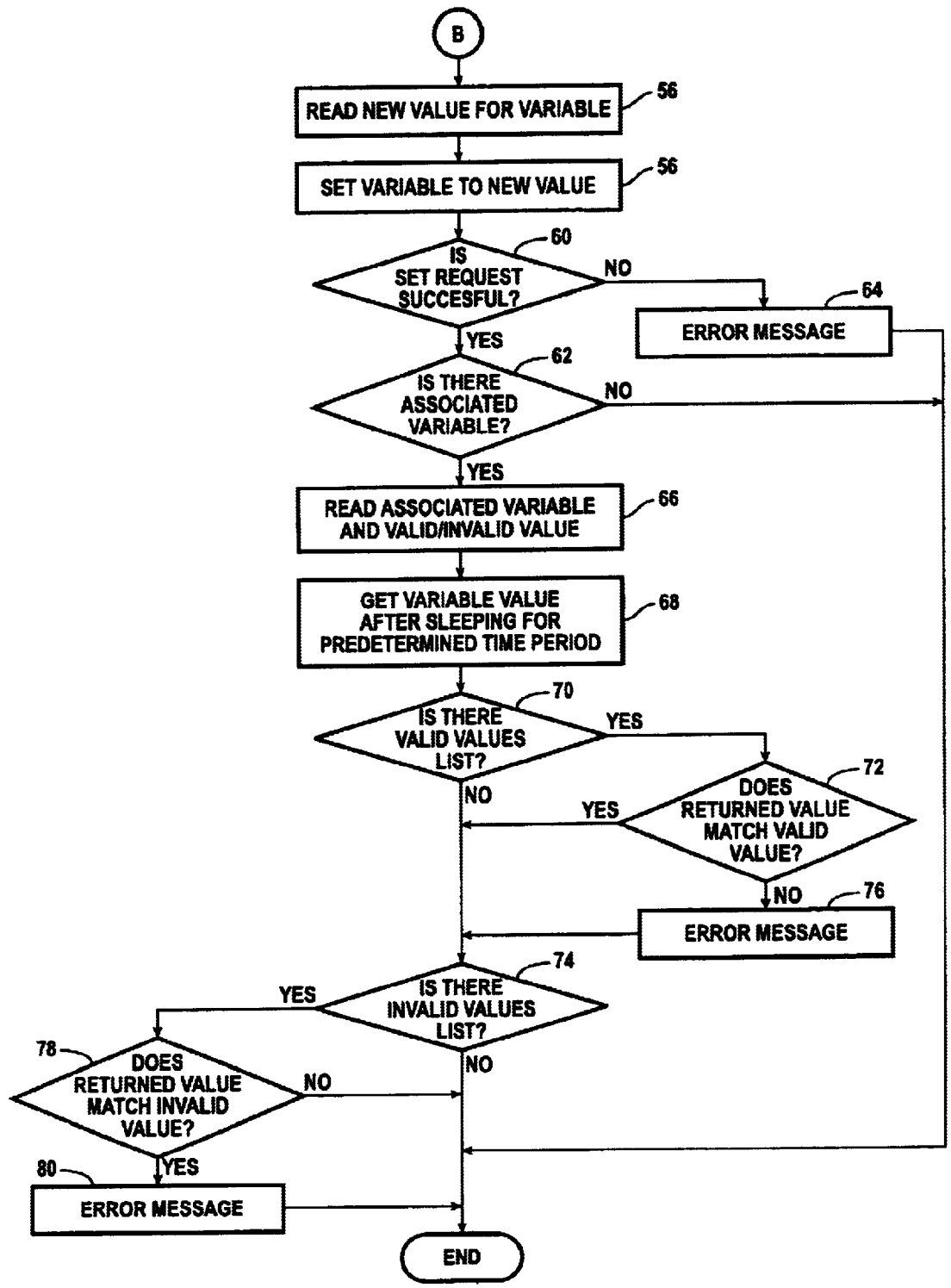

Turning now to FIG. 2, a logic flow diagram of a process for checking the level of SNMP MIB support by network devices is shown. FIG. 2 is broken into three parts, that is, FIGS. 2A, 2B, and 2C, where FIG. 2A substantially corresponds to the fundamental variable checker 12 of FIG. 1, FIG. 2B substantially corresponds to the dependent variable checker 14 of FIG. 1, and FIG. 2C substantially corresponds to the configure request variable checker 16 of FIG. 1. It would be possible to divide the MIB variables into three sets and run each case separately, however FIG. 2 shows the three cases combined so that only one input file is required.

Turning now to FIG. 2A, the process for checking begins at START. At block 20, a MIB variable is read from the input file provided by the device designer. Next at decision block 22, the process determines whether the variable has a dependent variable. If so, the process continues with FIG. 2B through continuation circle A and if not, the process continues with decision block 24. Assuming that there is no dependent variable, at decision block 24, the process determines whether there is a SET request for the variable. If so, the process continues with FIG. 2C through continuation circle B and if not, the process continues with block 26. Assuming that there is no SET request, at block 26, the process performs a GET for the value of the variable from the device being checked. Next at decision block 28, the process determines whether there is a VALID values list for the variable. If so, the process continues with decision block 30 and if not, the process continues with decision block 32. Assuming that there is a VALID values list, at decision block 30, the process compares the returned value from the device with the listed value for a match. If the values match, then the process continues with decision block 32. If the values do not match, then the process continues with block 34 where an error message is generated and the process continues with decision block 32. At decision block 32, the process determines whether there is an INVALID values list for the variable. If so, the process continues with decision block 36 and if not, the process ends for that variable. Assuming that there is an INVALID values list, at decision block 36, the process compares the returned value from the device with the listed value for a match. If the values do match, then the process continues with block 38 where an error message is generated and the process ends for that variable. If the values do not match, then the process ends for that variable.

Turning now to FIG. 2B, assume that at decision block 22 of FIG. 2A, the process determined that the variable has a dependent variable and that the process continued through continuation circle A. At block 40, the process reads the dependent variable from the input file provided by the device designer. Next at block 42, the process performs a GET for the values of both variables from the device being checked. Next at decision block 44, the process determines whether there is a VALID values list for the variables. If so, the process continues with decision block 46 and if not, the process continues with decision block 48. Assuming that there is a VALID values list, at decision block 46, the process compares the returned values from the device with the listed values for a match. If the values match, then the process continues with decision block 48. If the values do not match, then the process continues with block 50 where an error message is generated and the process continues with decision block 48. At decision block 48, the process determines whether there is an INVALID values list for the variables. If so, the process continues with decision block 52 and if not, the process ends for those variables. Assuming that there is an INVALID values list, at decision block 52, the process compares the returned values from the device with the listed values for a match. If the values do match, then the process continues with block 54 where an error message is generated and the process ends for those variables. If the values do not match, then the process ends for those variables.

Turning now to FIG. 2C, assume that at decision block 24 of FIG. 2A, the process determined that there is a SET request for the variable and that the process continued through continuation circle B. At block 56, the process reads the new value for the variable from the input file provided by the device designer. Next at block 58, the process performs a SET of the variable to the new value in the device being checked. Next at decision block 60, the process determines whether the SET request was successful. If so, the process continues with decision block 62 and if not, the process continues with block 64 where an error message is printed and the process ends for that variable. Assuming that the SET request was successful, at decision block 62, the process determines whether there is a least one associated variable. If so, the process continues with block 66 and if not, the process ends for that variable. Assuming that there is an associated variable, at block 66, the process reads the associated variable from the input file provided by the device designer. Next at block 68, the process performs a GET for the value of the associated variable from the device being checked after sleeping for a predetermined period of time. The length of the period of time will depend on how long it takes for the associated variable to reach its new state as a result of the SET request of block 58. Next at decision block 70, the process determines whether there is a VALID values list for the associated variable. If so, the process continues with decision block 72 and if not, the process continues with decision block 74. Assuming that there is a VALID values list, at decision block 70, the process compares the returned value from the device with the listed value for a match. If the values match, then the process continues with decision block 74. If the values do not match, then the process continues with block 76 where an error message is generated and the process continues with decision block 74. At decision block 74, the process determines whether there is an INVALID values list for the associated variable. If so, the process continues with decision block 78 and if not, the process ends for that variable. Assuming that there is an INVALID values list, at decision block 78, the process compares the returned value from the device with the listed value for a match. If the values do match, then the process continues with block 80 where an error message is printed and the process ends for that variable. If the values do not match, then the process ends for that variable. If the variable from block 24 of FIG. 2A has multiple associated variables, then blocks 62 through 80 are repeated for each associated variable.

The process of FIG. 2 is repeated with each MIB variable in the input file provided by the device designer. After the input file is empty, one or more output files for each NMS management application for which support has been checked is generated. The process is completed over and over until the device designer is satisfied with the results. In this way, each device can be made to conform to the EMBLEM standard.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for checking the level of manageability support of a network device during device development, wherein any and all variables and values for the network device are indicated in an input file, the method comprising:

identifying a variable to be checked in the input file;

reading a value for the variable from the network device;

determining whether there is a VALID values list for the variable in the input file, when there is a VALID values list, comparing the returned value from the network device with the listed value for a match and when the values do not match, outputting an error message for the variable; and determining whether there is a INVALID values list for the variable in the input file, when there is an INVALID values list, comparing the returned value from the network device with the listed value for a match and when the values match, outputting an error message for the variable.

2. The method as defined in claim 1, further comprising:

determining that the variable has a dependent variable;

identifying the dependent variable to be checked;

reading a value for both the variable and the dependent variable from the network device;

determining whether there is a VALID values list for the variables, when there is a VALID values list, comparing the returned values from the network device with the listed values for a match and when the values do not match, outputting an error message for the variables; and determining whether there is an INVALID values list for the variables, when there is an INVALID values list, comparing the returned values from the network device with the listed values for a match and when the values match, outputting an error message for the variables.

3. The method as defined in claim 2, further comprising:

determining that there is a configure request for the variable;

reading a new value for the variable;

configuring the variable with the new value in the device being checked;

determining whether the configure request was successful;

when the configure request is not successful, outputting an error message and ending the check for the variable; and when the configure request is successful, determining whether there is at least one associated variable;

when there is not at least one associated variable, ending the check for the variable; and when there is at least one associated variable, identifying the at least one associated variable;

reading the value of the at least one associated variable from the network device after sleeping for a predetermined period of time;

determining whether there is a VALID values list for the at least one associated variable, when there is a VALID values list, comparing the returned value from the network device with the listed value for a match and when the values do not match, outputting an error message for the at least one associated variable; and determining whether there is a INVALID values list for the at least one associated variable, when there is an INVALID values list, comparing the returned value from the network device with the listed value for a match and when the values match, outputting an error message for the at least one associated variable.

4. The method as defined in claim 1, further comprising:

determining that there is a configure request for the variable;

reading a new value for the variable;

configuring the variable with the new value in the device being checked;

determining whether the configure request was successful;

when the configure request is not successful, outputting an error message and ending the check for the variable; and when the configure request is successful, determining whether there is at least one associated variable;

when there is not at least one associated variable, ending the check for the variable; and when there is at least one associated variable, identifying the at least one associated variable;

reading the value of the at least one associated variable from the network device after sleeping for a predetermined period of time;

determining whether there is a VALID values list for the at least one associated variable, when there is a VALID values list, comparing the returned value from the network device with the listed value for a match and when the values do not match, outputting an error message for the at least one associated variable; and determining whether there is a INVALID values list for the at least one associated variable, when there is an INVALID values list, comparing the returned value from the network device with the listed value for a match and when the values match, outputting an error message for the at least one associated variable.

5. A method for checking the level of manageability support of a network device during device development, wherein any and all variables and values for the network device are indicated in an input file, the method comprising:

determining that the variable has a dependent variable;

identifying the dependent variable to be checked in the input file;

reading a value for both the variable and the dependent variable from the network device;

determining whether there is a VALID values list for the variables in the input file, when there is a VALID values list, comparing the returned values from the network device with the listed values for a match and when the values do not match, outputting an error message for the variables; and determining whether there is an INVALID values list for the variables in the input file, when there is an INVALID values list, comparing the returned values from the network device with the listed values for a match and when the values match, outputting an error message for the variables.

6. The method as defined in claim 5, further comprising:

determining that there is a configure request for the variable;

reading a new value for the variable;

configuring the variable with the new value in the device being checked;

determining whether the configure request was successful;

when the configure request is not successful, outputting an error message and ending the check for the variable; and when the configure request is successful, determining whether there is at least one associated variable;

when there is not at least one associated variable, ending the check for the variable; and when there is at least one associated variable, identifying the at least one associated variable;

reading the value of the at least one associated variable from the network device after sleeping for a predetermined period of time;

determining whether there is a VALID values list for the at least one associated variable, when there is a VALID values list, comparing the returned value from the network device with the listed value for a match and when the values do not match, outputting an error message for the at least one associated variable; and determining whether there is a INVALID values list for the at least one associated variable, when there is an INVALID values list, comparing the returned value from the network device with the listed value for a match and when the values match, outputting an error message for the at least one associated variable.

7. A method for checking the level of manageability support of a network device during device development, wherein any and all variables and values for the network device are indicated in an input file, the method comprising:

determining that there is a configure request for the variable;

reading a new value for the variable from the input file;

configuring the variable with the new value in the device being checked;

determining whether the configure request was successful;

when the configure request is not successful, outputting an error message and ending the check for the variable; and when the configure request is successful, determining whether there is at least one associated variable in the input file;

when there is not at least one associated variable, ending the check for the variable; and when there is at least one associated variable, identifying the at least one associated variable;

reading the value of the at least one associated variable from the network device after sleeping for a predetermined period of time;

determining whether there is a VALID values list for the at least one associated variable in the input file, when there is a VALID values list, comparing the returned value from the network device with the listed value for a match and when the values do not match, outputting an error message for the at least one associated variable; and determining whether there is a INVALID values list for the at least one associated variable in the input file, when there is an INVALID values list, comparing the returned value from the network device with the listed value for a match and when the values match, outputting an error message for the at least one associated variable.

8. A computer-readable medium having stored thereon computer-executable instructions for performing a method for checking the level of manageability support of a network device during device development, wherein any and all variables and values for the network device are indicated in an input file, the method comprising:

identifying a variable to be checked in the input file;

reading a value for the variable from the network device;

determining whether there is a VALID values list for the variable in the input file, when there is a VALID values list, comparing the returned value from the network device with the listed value for a match and when the values do not match, outputting an error message for the variable; and determining whether there is a INVALID values list for the variable in the input file, when there is an INVALID values list, comparing the returned value from the network device with the listed value for a match and when the values match, outputting an error message for the variable.

9. The computer-readable medium as defined in claim 8, wherein the method further comprises:

determining that the variable has a dependent variable;

identifying the dependent variable to be checked;

reading a value for both the variable and the dependent variable from the network device;

determining whether there is a VALID values list for the variables, when there is a VALID values list, comparing the returned values from the network device with the listed values for a match and when the values do not match, outputting an error message for the variables; and determining whether there is an INVALID values list for the variables, when there is an INVALID values list, comparing the returned values from the network device with the listed values for a match and when the values match, outputting an error message for the variables.

10. The computer-readable medium as defined in claim 9, wherein the method further comprises:

determining that there is a configure request for the variable;

reading a new value for the variable;

configuring the variable with the new value in the device being checked;

determining whether the configure request was successful;

when the configure request is not successful, outputting an error message and ending the check for the variable; and when the configure request is successful, determining whether there is at least one associated variable;
when there is not at least one associated variable, ending the check for the variable; and
when there is at least one associated variable, identifying the at least one associated variable;
reading the value of the at least one associated variable from the network device after sleeping for a predetermined period of time;
determining whether there is a VALID values list for the at least one associated variable, when there is a VALID values list, comparing the returned value from the network device with the listed value for a match and when the values do not match, outputting an error message for the at least one associated variable; and
determining whether there is a INVALID values list for the at least one associated variable, when there is an INVALID values list, comparing the returned value from the network device with the listed value for a match and when the values match, outputting an error message for the at least one associated variable.

11. The computer-readable medium as defined in claim 8, wherein the method further comprises:

determining that there is a configure request for the variable;

reading a new value for the variable;

configuring the variable with the new value in the device being checked;

determining whether the configure request was successful;

when the configure request is not successful, outputting an error message and ending the check for the variable; and when the configure request is successful, determining whether there is at least one associated variable;
when there is not at least one associated variable, ending the check for the variable; and
when there is at least one associated variable, identifying the at least one associated variable;
reading the value of the at least one associated variable from the network device after sleeping for a predetermined period of time;
determining whether there is a VALID values list for the at least one associated variable, when there is a VALID values list, comparing the returned value from the network device with the listed value for a match and when the values do not match, outputting an error message for the at least one associated variable; and
determining whether there is a INVALID values list for the at least one associated variable, when there is an INVALID values list, comparing the returned value from the network device with the listed value for a match and when the values match, outputting an error message for the at least one associated variable.

12. A computer-readable medium having stored thereon computer-executable instructions for performing a method for checking the level of manageability support of a network device during device development, wherein any and all variables and values for the network device are indicated in an input file, the method comprising:

determining that the variable has a dependent variable;

identifying the dependent variable to be checked in the input file;

reading a value for both the variable and the dependent variable from the network device;

determining whether there is a VALID values list for the variables in the input file, when there is a VALID values list, comparing the returned values from the network device with the listed values for a match and when the values do not match, outputting an error message for the variables; and determining whether there is an INVALID values list for the variables in the input file, when there is an INVALID values list, comparing the returned values from the network device with the listed values for a match and when the values match, outputting an error message for the variables.

13. The computer-readable medium as defined in claim 12, wherein the method further comprises:

determining that there is a configure request for the variable;

reading a new value for the variable;

configuring the variable with the new value in the device being checked;

determining whether the configure request was successful;

when the configure request is not successful, outputting an error message and ending the check for the variable; and when the configure request is successful, determining whether there is at least one associated variable;
when there is not at least one associated variable, ending the check for the variable; and
when there is at least one associated variable, identifying the at least one associated variable;
reading the value of the at least one associated variable from the network device after sleeping for a predetermined period of time;
determining whether there is a VALID values list for the at least one associated variable, when there is a VALID values list, comparing the returned value from the network device with the listed value for a match and when the values do not match, outputting an error message for the at least one associated variable; and
determining whether there is a INVALID values list for the at least one associated variable, when there is an INVALID values list, comparing the returned value from the network device with the listed value for a match and when the values match, outputting an error message for the at least one associated variable.

14. A computer-readable medium having stored thereon computer-executable instructions for performing a method for checking the level of manageability support of a network device during device development, wherein any and all variables and values for the network device are indicated in an input file, the method comprising:
   determining that there is a configure request for the variable;
   reading a new value for the variable from the input file;
   configuring the variable with the new value in the device being checked;
   determining whether the configure request was successful;
   when the configure request is not successful, outputting an error message and ending the check for the variable; and
   when the configure request is successful, determining whether there is at least one associated variable in the input file;
      when there is not at least one associated variable, ending the check for the variable; and
      when there is at least one associated variable, identifying the at least one associated variable;
      reading the value of the at least one associated variable from the network device after sleeping for a predetermined period of time;
      determining whether there is a VALID values list for the at least one associated variable in the input file, when there is a VALID values list, comparing the returned value from the network device with the listed value for a match and when the values do not match, outputting an error message for the at least one associated variable; and
      determining whether there is a INVALID values list for the at least one associated variable in the input file, when there is an INVALID values list, comparing the returned value from the network device with the listed value for a match and when the values match, outputting an error message for the at least one associated variable.

15. An apparatus for checking the level of manageability support of a network device during device development, wherein any and all variables and values for the network device are indicated in an input file, the apparatus comprising:
   means for identifying a variable to be checked in the input file;
   means for reading a value for the variable from the network device;
   means for determining whether there is a VALID values list for the variable in the input file, when there is a VALID values list, the returned value from the network device is compared with the listed value for a match and when the values do not match, an error message for the variable is outputted; and
   means for determining whether there is a INVALID values list for the variable in the input file, when there is an INVALID values list, the returned value from the network device is compared with the listed value for a match and when the values match, an error message for the variable is outputted.

16. The apparatus as defined in claim 15, further comprising:
   means for determining that the variable has a dependent variable;
   means for identifying the dependent variable to be checked;
   means for reading a value for both the variable and the dependent variable from the network device;
   means for determining whether there is a VALID values list for the variables, when there is a VALID values list, the returned values from the network device are compared with the listed values for a match and when the values do not match, an error message for the variables is outputted; and
   means for determining whether there is an INVALID values list for the variables, when there is an INVALID values list, the returned values from the network device are compared with the listed values for a match and when the values match, an error message for the variables is outputted.

17. The apparatus as defined in claim 16, further comprising:
   means for determining that there is a configure request for the variable;
   means for reading a new value for the variable;
   means for configuring the variable with the new value in the device being checked;
   means for determining whether the configure request was successful;
   means for, when the configure request is not successful, outputting an error message and ending the check for the variable; and
   means for, when the configure request is successful, determining whether there is at least one associated variable;
      means for, when there is not at least one associated variable, ending the check for the variable; and
      means for, when there is at least one associated variable, identifying the at least one associated variable;
      means for reading the value of the at least one associated variable from the network device after sleeping for a predetermined period of time;
      means for determining whether there is a VALID values list for the at least one associated variable, when there is a VALID values list, the returned value from the network device is compared with the listed value for a match and when the values do not match, an error message for the at least one associated variable is outputted; and
      means for determining whether there is a INVALID values list for the at least one associated variable, when there is an INVALID values list, the returned value from the network device is compared with the listed value for a match and when the values match, an error message for the at least one associated variable is outputted.

18. The apparatus as defined in claim 15, further comprising:
   means for determining that there is a configure request for the variable;
   means for reading a new value for the variable;
   means for configuring the variable with the new value in the device being checked;
   means for determining whether the configure request was successful;
   means for, when the configure request is not successful, outputting an error message and ending the check for the variable; and means for, when the configure request is successful, determining whether there is at least one associated variable;
means for, when there is not at least one associated variable, ending the check for the variable; and
means for, when there is at least one associated variable, identifying the at least one associated variable;
means for reading the value of the at least one associated variable from the network device after sleeping for a predetermined period of time;
means for determining whether there is a VALID values list for the at least one associated variable, when there is a VALID values list, the returned value from the network device is compared with the listed value for a match and when the values do not match, an error message for the at least one associated variable is outputted; and
means for determining whether there is a INVALID values list for the at least one associated variable, when there is an INVALID values list, the returned value from the network device is compared with the listed value for a match and when the values match, an error message for the at least one associated variable is outputted.

19. An apparatus for checking the level of manageability support of a network device during device development, wherein any and all variables and values for the network device are indicated in an input file, the apparatus comprising:
means for determining that the variable has a dependent variable;
means for identifying the dependent variable to be checked in the input file;
means for reading a value for both the variable and the dependent variable from the network device;
means for determining whether there is a VALID values list for the variables in the input file, when there is a VALID values list, the returned values from the network device are compared with the listed values for a match and when the values do not match, an error message for the variables is outputted; and
means for determining whether there is an INVALID values list for the variables in the input file, when there is an INVALID values list, the returned values from the network device are compared with the listed values for a match and when the values match, an error message for the variables is outputted.

20. The apparatus as defined in claim 19, further comprising:
means for determining that there is a configure request for the variable;
means for reading a new value for the variable;
means for configuring the variable with the new value in the device being checked;
means for determining whether the configure request was successful;
means for, when the configure request is not successful, outputting an error message and ending the check for the variable; and
means for, when the configure request is successful, determining whether there is at least one associated variable;
means for, when there is not at least one associated variable, ending the check for the variable; and
means for, when there is at least one associated variable, identifying the at least one associated variable;
means for reading the value of the at least one associated variable from the network device after sleeping for a predetermined period of time;
means for determining whether there is a VALID values list for the at least one associated variable, when there is a VALID values list, the returned value from the network device is compared with the listed value for a match and when the values do not match, an error message for the at least one associated variable is outputted; and
means for determining whether there is a INVALID values list for the at least one associated variable, when there is an INVALID values list, the returned value from the network device is compared with the listed value for a match and when the values match, an error message for the at least one associated variable is outputted.

21. An apparatus for checking the level of manageability support of a network device during device development, wherein any and all variables and values for the network device are indicated in an input file, the apparatus comprising:
means for determining that there is a configure request for the variable;
means for reading a new value for the variable from the input file;
means for configuring the variable with the new value in the device being checked;
means for determining whether the configure request was successful;
means for, when the configure request is not successful, outputting an error message and ending the check for the variable; and
means for, when the configure request is successful, determining whether there is at least one associated variable in the input file;
means for, when there is not at least one associated variable, ending the check for the variable; and
means for, when there is at least one associated variable, identifying the at least one associated variable;
means for reading the value of the at least one associated variable from the network device after sleeping for a predetermined period of time;
means for determining whether there is a VALID values list for the at least one associated variable in the input file, when there is a VALID values list, the returned value from the network device is compared with the listed value for a match and when the values do not match, an error message for the at least one associated variable is outputted; and
means for determining whether there is a INVALID values list for the at least one associated variable in the input file, when there is an INVALID values list, the returned value from the network device is compared with the listed value for a match and when the values match, an error message for the at least one associated variable is outputted.

22. An apparatus for checking the level of manageability support of a network device during device development, wherein any and all variables and values for the network device are indicated in an input file, the apparatus comprising:

a fundamental variable checker for identifying the variable in the input file, obtaining a value for the variable, checking the value against any and all VALID/INVALID values in the input file, and generating an error message if the value of the variable is found to not be valid or to be invalid; and a configure request variable checker for identifying the variable, observing that there is a configure request for the variable, configuring the variable with a new value, and verifying that the configure request was successful, wherein a determination is made that at least one associated variable exists, a predetermined period of time is allowed to elapse before the value of the at least one associated variable is obtained, the value is checked against any and all VALID/INVALID values, and if the value of the at least one associated variable is found to not be valid or to be invalid, then an error message is generated.

23. The apparatus as defined in claim 22, further comprising:

a dependent variable checker for identifying the variable and finding the variable to have a dependent variable, wherein the values for both the variables are obtained, their values are checked against any and all VALID/INVALID values, and if the values of the variables are found to not be valid or to be invalid, then an error message is generated.

24. An apparatus for checking the level of manageability support of a network device during device development, wherein any and all variables and values for the network device are indicated in an input file, the apparatus comprising:

a dependent variable checker for identifying the variable and finding the variable to have a dependent variable, wherein the values for both the variables are obtained, their values are checked against any and all VALID/INVALID values in the input file, and if the values of the variables are found to not be valid or to be invalid, then an error message is generated; and a configure request variable checker for identifying the variable, observing that there is a configure request for the variable, configuring the variable with a new value, and verifying that the configure request was successful, wherein a determination is made that at least one associated variable exists, a predetermined period of time is allowed to elapse before the value of the at least one associated variable is obtained, the value is checked against any and all VALID/INVALID values, and if the value of the at least one associated variable is found to not be valid or to be invalid, then an error message is generated.

* * * * *